United States Patent

[11] 3,622,893

| [72] | Inventors | Bernard Dervieux<br>Chatenay-Malabry;<br>Jean Douzon, Paris; Andre Girouy, Paris,<br>all of France |
|---|---|---|
| [21] | Appl. No. | 768,389 |
| [22] | Filed | Oct. 17, 1968 |
| [45] | Patented | Nov. 23, 1971 |
| [73] | Assignee | Commissariat A L'Energie Atomique<br>Paris, France |
| [32] | Priority | Aug. 26, 1968 |
| [33] | | Great Britain |
| [31] | | 40719/68 |

[54] METHOD AND APPARATUS FOR ANALYZING AN AMPLITUDE SPECTRUM
9 Claims, 6 Drawing Figs.

[52] U.S. Cl. .................................................. 328/115,
307/235, 328/147
[51] Int. Cl. ....................................................... H03k 5/20
[50] Field of Search........................................... 307/235;
328/115.7, 146–151

[56] References Cited
UNITED STATES PATENTS

| 2,673,294 | 3/1954 | Battel et al.................. | 328/115 X |
| 2,833,922 | 5/1958 | Gerks........................... | 328/115 X |
| 2,943,262 | 6/1960 | Ball............................... | 328/115 |

*Primary Examiner*—Donald D. Forrer
*Assistant Examiner*—John Zazworsky
*Attorney*—Craig, Antonelli & Hill ABSTRACT: In method for analyzing the amplitude spectrum of electric pulses, a direct current of predetermined value variable by steps is generated, the amplitude of each pulse is compared with the current, a signal is emitted responsive to each pulse whose amplitude is greater than value of the current and said signals are counted. In a modified embodiment a second direct current is generated and a signal is emitted when the amplitude of a pulse is between the two currents. A device for carrying out the method is also described.

INVENTORS
BERNARD DERVIEUX
JEAN DOUZON
ANDRE GIROUY

BY

ATTORNEYS

METHOD AND APPARATUS FOR ANALYZING AN AMPLITUDE SPECTRUM

This invention is directed to a method for analyzing an amplitude spectrum which is statistically invariable in time and also to a device for carrying out said method.

The analysis of the amplitude spectrum of pulses produced at a distant point at which it is not possible to place a large equipment unit such as a multichannel analyzer creates a problem which is difficult to solve when the pulses cannot be transmitted without undergoing distortions to such an extent that any analysis carried out from a distance is unreliable. This problem arises for instance in the prospection of radioactive ores and mineral deposits using the method of radioactive logging since there can obviously be no question of incorporating a multichannel analyzer in the probe unit located in the borehole. The method chiefly employed up to the present time has been that of radioactivity sample logging which consists in taking samples of the ground at different depths, in bringing them to the surface and studying the radiation spectrum emitted by the samples using a multichannel analyzer. However, this method is time consuming, costly and does not permit immediate orientation of researches on account of the delay involved in obtaining the results of the analysis.

Measurements of total activity during borehole logging have also been taken but the information obtained in this manner does not make it possible to determine the composition of a vein or lode which has been located and samples must nevertheless be taken in order to gain complete data.

Attempts have also been made to make discriminations of radiation energy from a distance by comparison between the pulse voltages obtained by means of a detector and a reference voltage and scanning the spectrum by a mechanical process. However, the results are of no great value at appreciable distances from the detector and are very sensitive to temperature.

An object of the present invention is to overcome the problems mentioned above by making a comparison between the pulses to be analyzed and a reference signal near the point at which the pulses are produced.

To this end, the invention proposes a method whereby a direct current of predetermined value is generated, the amplitude of each pulse is compared with the value of said current, a signal is emitted when the amplitude of a pulse is greater than the value of the current or conversely, said signals are counted, and said direct current value is varied at time intervals by steps according to a predetermined law.

The reference threshold which permits of selection is thus constituted by a direct current value which is constant over the whole length of the circuit through which the current flows if proper insulation is provided. The selection is therefore carried out in a wholly reliable and accurate manner. Any possible deformation of signals emitted during their transmission does not entail any disadvantage since said signals are subjected only to a counting operation which can evidently be preceded by a reshaping.

In the case of radioactivity borehole logging, the method according to the present invention permits of analysis on the surface of electrical pulses derived from a proportional detector i.e. from a detector which provides pulses whose height is in direct relation with the radiation energy (proportional counter or scintillator-photomultiplier assembly, for example), said detector being mounted within a probe unit which can be placed in a borehole at a depth of several hundred meters. The method does not call for any mechanical system for scanning the spectrum and permits direct analytical study of the subsoil from the surface.

The method in accordance with the invention can be employed for the purpose of carrying out an amplitude selection either by simple discrimination by comparing the pulse amplitude with the intensity of a single direct current which constitutes a threshold or by channel analysis by comparing the pulse amplitude with the amplitude of two different direct currents which define the thresholds of a channel: in this case, a signal is emitted when the amplitude of the pulse is comprised between the two intensities.

The invention also proposes a device which is intended to carry out the method and comprises a generator for producing direct current of predetermined and adjustable intensity, means for modifying said intensity in time and in equal steps, means for providing a comparison between the amplitude of said electric pulses and the intensity of the current and for emitting a signal when the amplitude is smaller than said intensity or conversely and means for counting said signals.

Said device can be regrouped in two assemblies which are constituted in one case by a detection head and in the other case by an analytical unit and which can be placed at a considerable distance from each other: the detection head comprises the means for comparison and emission of signals and may additionally comprise the detector which supplies the electric pulses from a phenomenon to be studied. The analytical unit comprises the direct current generator and the counting means.

A better understanding of the invention will be gained from the following description of modes of application of the invention which are given by way of nonlimitative example, reference being made to the accompanying drawings, in which.

Figure 1:
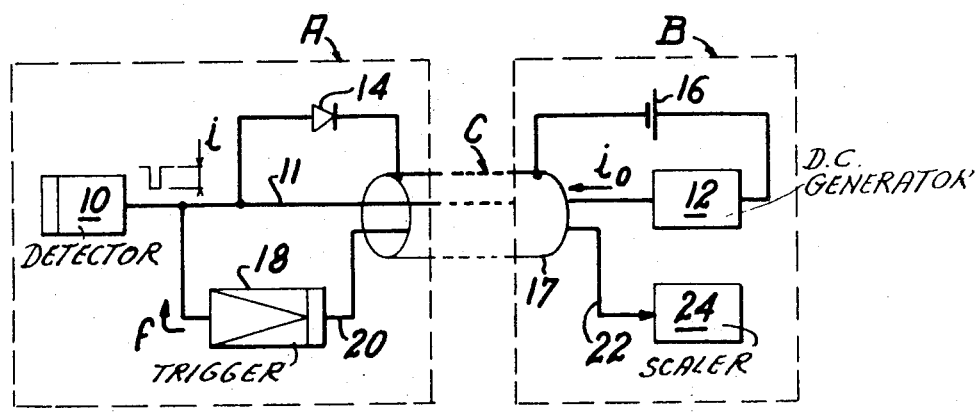
FIG. 1 is a schematic diagram of an amplitude-selecting device in accordance with the invention which operates as a discriminator.

The amplitude-selecting device, the general arrangement of which is shown in the diagram of FIG. 1, is made up of elements which are disposed between a detection head generally designated by the reference A and an analytical unit designated by the reference B, said elements being interconnected by means of a coaxial cable C which can be of substantial length.

The amplitude-selecting device which is shown generally in FIG. 1 comprises within the detection head A a source 10 of electric current pulses having a single polarity, said pulses being of variable amplitude $i$ within the spectrum which it is proposed to analyze. The source 10 is constituted, for example, by a nuclear radiation detector. The source 10 delivers its pulses to a conductor 11 which is connected by the coaxial cable C to a generator 12 which produces a stabilized and adjustable direct current $i_0$ having a direction of flow opposite to $i$ and defining a discrimination threshold. Said generator forms part of the analytical unit B. A device 14 which is conductive in only one direction and may, for example, be of the diode type, prevents the passage of pulses delivered by the source 10 and, on the contrary, permits the return of the current $i_0$ towards the supply 16 of the generator 12 by means of the screening tube 17 of the coaxial cable C. Said supply 16 must have a sufficient capacitance to be capable of delivering a constant current $i_0$ in spite of variations in load.

The detection head further comprises a trigger 18 which is intended to supply a predetermined voltage at its output 20 even when a current of very low value flows in the direction indicated by the arrow $f$ into its input circuit which is constituted, for example, by a saturable high-gain amplifier having a low input level.

The output of the trigger 18 is connected via a conductor 22 of the coaxial cable to a counting circuit 24 which forms part of the analytical unit B. If necessary, a shaping circuit can be interposed between the cable and the counting circuit. It is readily apparent that the polarity of the supply 16, the polarity of the pulses delivered by the source 10 and the direction of conduction of the different circuits could be reversed.

The operation of the selecting device of FIG. 1 as a threshold discriminator has been brought out by the foregoing description and will therefore not be described in detail.

If the amplitude $i$ of the pulses delivered by the source 10 is smaller than the intensity $i_0$, the source drains off a portion of the current $i_0$. The difference $i-i_0$ returns through the device 14 and the screening tube 17 towards the voltage supply 16. No current passes into the input circuit of the trigger 18 and no signal therefore appears at its output 20. The same condition exists when there is no pulse, that is to say when $i=0$ and in the extreme case in which $i=i_0$.

If, on the contrary, the amplitude $i$ of a pulse is greater than the intensity $i_0$ at least at the peak, the current $i$ is partly supplied by $i_0$ and partly by the input circuit of the trigger 18, in which case the unidirectional device 14 prevents the flow of said current since it arrives in the blocking direction. The current $i-i_0$ which flows through the input circuit of the trigger during the time of the pulse or in other words for the period of time during which $i$ is greater than $i_0$ releases the trigger 18 which delivers at its output a signal in the form of a voltage square wave. This signal is transmitted by the conductor 22 of the coaxial cable C to the counting circuit 24. The term "counting circuit" as used in this context is intended to mean either a conventional scaler which provides numerical information or an analogue display element (such as an integrating ratemeter, for example).

In any case, it is apparent that only those pulses whose amplitude $i$ is greater than the constant current $i_0$ cause the appearance of a signal. The current $i_0$ accordingly determines a threshold: in order to vary said threshold, it is only necessary to vary the value of $i_0$.

The constant-current generator 12 can be located at the end of a very long cable C inasmuch as the current is independent of the resistance of said cable if the supply voltage is sufficient for the resistance of the cable. In consequence, the threshold can be varied from a distance and advantageously at constant time intervals. A new count must obviously correspond to each step.

Figure 2:
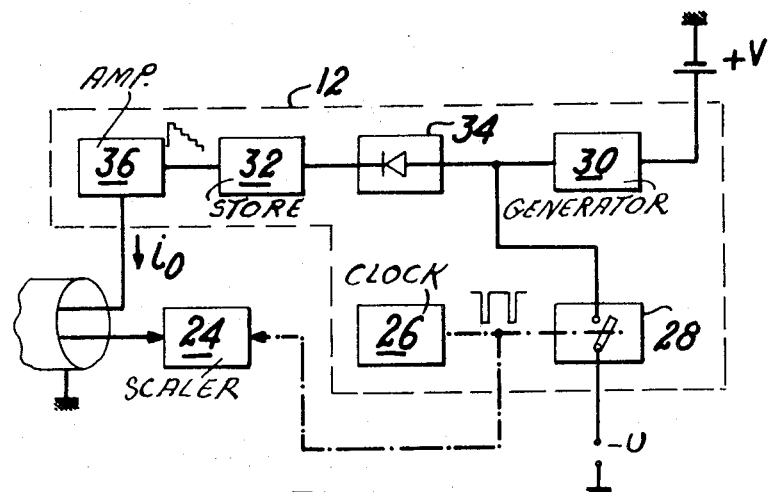
FIG. 2 is a schematic diagram of a direct current generator which permits of automatic amplitude variation in time and in steps (commonly referred to as a linear sweep generator) and which is intended for use in the device of FIG. 1.

FIG. 2 shows by way of example a constant-current generator whereby the above-mentioned variation in steps is carried out automatically. Said generator 12 comprises a clock 26 which controls an electronic switch 28. The square-topped pulses which are supplied periodically by the clock close the switch at time intervals T over a calibrated period of time $t$. A generator 30 delivers a constant direct current which flows alternately towards a memory 32 via a unilateral conduction device 34 (such as a diode, for example) or towards a negative voltage source $-U$, depending on whether the switch 28 is either open or closed. The memory 32 delivers between its input and output terminals a voltage which is proportional to the number of pulses which it has received and stored. The circuit 36 which is controlled by the memory 32 is of a type which delivers an output current $i_0$ which is proportional to its input voltage and does not disturb the information contained in the memory 32.

The operation of this device is as follows: each time the switch 28 is closed, the voltage which is developed across the terminals of the memory 32 (and which is initially zero) increases by one constant voltage step. Said voltage therefore increases in jumps which occur at equal time intervals. The generator 36 supplies to the conductor 11 a current $i_0$ which is proportional to the input voltage and therefore increases linearly in time from zero. At the same time, each drive pulse supplied by the clock can be employed for the purpose of controlling the recording of the contents and resetting of the counter 24.

The generator 12 as thus constituted provides a "current ramp" which displaces linearly as a function of time the threshold of the discriminator selector in accordance with FIG. 1 and permits scanning over an amplitude range which can automatically be limited to a value which has the effect of stopping the clock.

Figure 3:
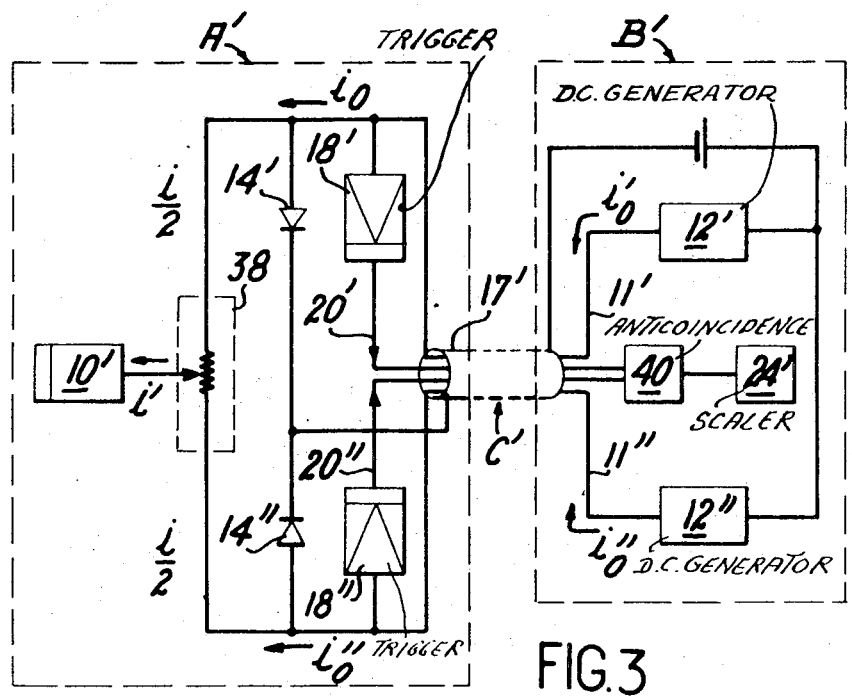
FIG. 3 is a schematic diagram of another amplitude-selecting device in accordance with the invention which operates as a single-channel selector.

Whereas the device of FIG. 1 carries out simply a discrimination between those pulses whose amplitude is higher than a threshold and the others, the form of execution shown in FIG. 3 carries out a selection of amplitude which entails the need to count solely those pulses whose amplitude is within a channel defined by two predetermined values which are fixed by the value of intensity of two direct currents. The device which is illustrated in FIG. 3 comprises circuits which correspond to those of FIG. 1 and which, for the sake of enhanced simplicity, will be designated by the same reference numeral followed by the prime index and by prime and second indices when said circuits are duplicated.

The device comprises a source 10' of pulses having an amplitude $i'$ which is associated with two similar discrimination lines corresponding to intensities $i_0'$ and $i_0''$ ($i_0'$ being higher than $i_0''$) and which delimit a channel. The term "lower line" as used hereinafter will be understood to mean the line whose threshold $i_0''$ is the lower of the two whilst the "upper line" has the higher threshold $i_0'$. Each line comprises a generator 12' or 12'', a unidirectional device 14' or 14'' and a trigger 18' or 18''.

The source 10' drives a balancing circuit 38, the function of which is to divide the amplitude of each pulse $i'$ into two equal parts having an amplitude $i'/2$ which are compared with $i_0''$ and $i_0'$ in both lines. The outputs 20' and 20'' of the triggers 18' and 18'' are coupled with a conventional shaping and anticoincidence device 40 which supplies the counter 24'. This device can form part either of the head A' or of the unit B': in the former case, information can readily be transmitted over a long distance since it is easy to correct any deformations of transmission by further shaping at the receiving end of the cable C'.

The operation of the amplitude selector of FIG. 3 is similar to that of the discriminator of FIG. 1. When a pulse is emitted by the source 10':

If the half-amplitude $i'/2$ $/2$ is smaller than both thresholds, no signal appears at the outputs 20' and 20'' of the triggers 18' and 18'' $/2$<these triggers, as has been explained earlier, do not receive any input current.

If the half-amplitude $i/2$ is larger than the lower threshold but smaller than the upper threshold, that is to say if $i_0''<i'/2<i_0''''$ alone delivers a signal.

If the half-amplitude $i/2$ is larger than both thresholds, both outputs 20' and 20'' deliver a signal.

The counter 24' therefore receives through the intermediary of the device 40 a digital signal for each pulse located within the channel.

Figure 4:
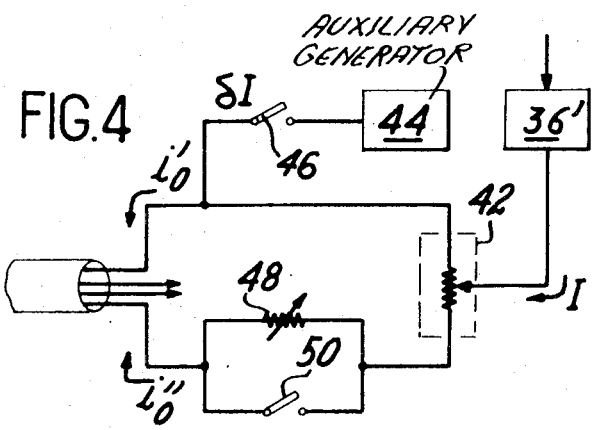
FIG. 4 is a schematic diagram of a circuit arrangement whereby the two currents delimiting the channel of the device of FIG. 2 can be obtained from the current generator of FIG. 2.

The generators 12' and 12'' can be constituted by a circuit arrangement which is similar to that of FIG. 2 but modified as shown in FIG. 4 for supplying the two threshold currents $i_0'$ and $i_0''$ and displacing them simultaneously. According to the schematic diagram of FIG. 4, the current I which is derived from the circuit 36' (which is identical with the circuit 36 of FIG. 2) is divided into an upper line and a lower line by means of a potentiometric device 42. The upper line receives a constant and adjustable auxiliary current $\delta I$ which is generated by a circuit 44 when the mechanical or electronic switch 46 is closed. In the lower line, an adjustable unbalance resistance 48 can be introduced by opening the switch 50 and can be short circuited by said switch when this latter is closed.

The operation of the circuit which is illustrated in FIG. 4 is as follows: The switch 46 being open and the switch 50 being closed, the potentiometer 42 is adjusted so as to obtain equal currents in both lines, that is to say $i_0'=i_0''=I/2$. The currents $i_0'$ and $i_0''$ represent those which are delivered by the generators 12' and 12" shown in FIG. 3. The thresholds defined by these currents are equal and the width of the channel is zero.

In order to obtain a fixed channel width, the current $i_o'$ in the upper line is increased by a constant value $\delta I$ by closing the switch 46. Thus, the channel width can be adjusted by varying the current $\delta I$. From this moment, the variation of the two currents as a result of the operation of the generator 36' will take place while maintaining a constant difference $\delta I$. In order to provide a better definition of the energy peaks contained in the pulse spectra, and in particular when the source 10' is a radiation detector, it can be of interest to vary the width of the channel (for example proportionally to the mean energy within the channel). This is particularly true in the case of mining or medical research. In order to obtain this result, it is only necessary to upset the balance obtained by means of the potentiometer 42 by opening the switch 50 and introducing the resistance 48. This unbalance $i_o'/i_o''$ is equal to a constant percentage of $\delta I$.

The diagram of FIG. 4 offers a further possibility which consists in adding a fixed portion $\Delta I$ to the extent of the channel $i_o'-i_o''$. This makes it possible in particular to increase the width of the channel in the vicinity of $i_o''=0$. This result is obtained by opening the switch 50 whilst the switch 46 is closed.

The selecting circuit with two lines and automatic scanning can obviously be operated as a simple discriminator having an automatic variable discrimination level. For this purpose, it is merely necessary to establish the fixed-width channel position (switches 50 and 46 closed) and to place the level of the upper line above the largest possible amplitude by increasing the current $\Delta I$ to a sufficient extent.

Among the methods of operation of the devices of FIGS. 3 and 4, it frequently proves necessary to select the following: the amplitude selector is associated with a paper strip recorder, the strip being wound off by means of a step-by-step motor, said motor being driven by the clock pulses which also produce the "linear ramp" current. The length of paper wound off is thus caused to correspond to the mean amplitude of the pulses located within the channel. In the case of the study of radioactive radiation by means of a proportional detector, the length of paper which is wound off will accordingly correspond directly to the radiation energy and the recording will provide the number of pulses for each energy channel and will therefore represent the energy spectrum of the radiation.

Figure 5:
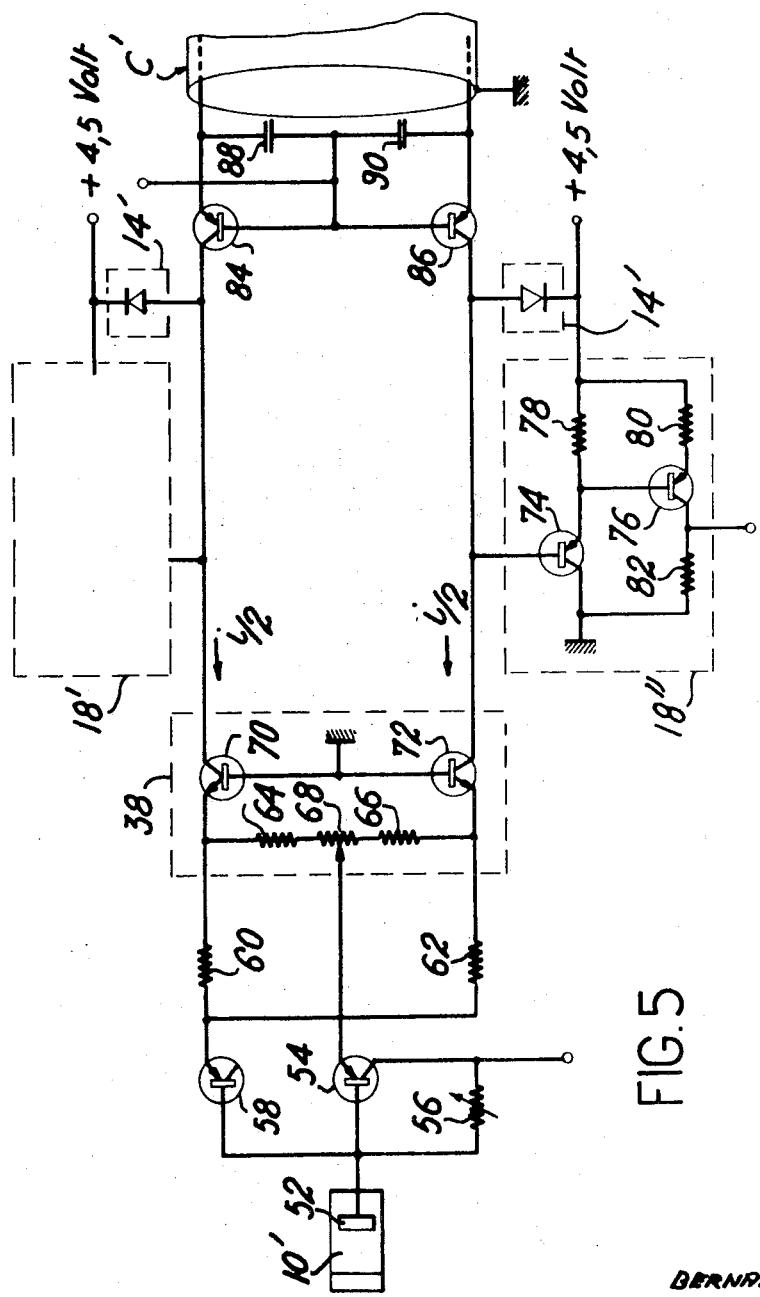
FIGS. 5 and 6 are diagrams of the electronic circuitry of the detection head and analytical unit of a single-channel amplitude-selecting assembly with automatic scanning of the spectrum, this assembly being intended for the purpose of prospecting radioactive minerals by radioactivity borehole logging.
Figure 6:
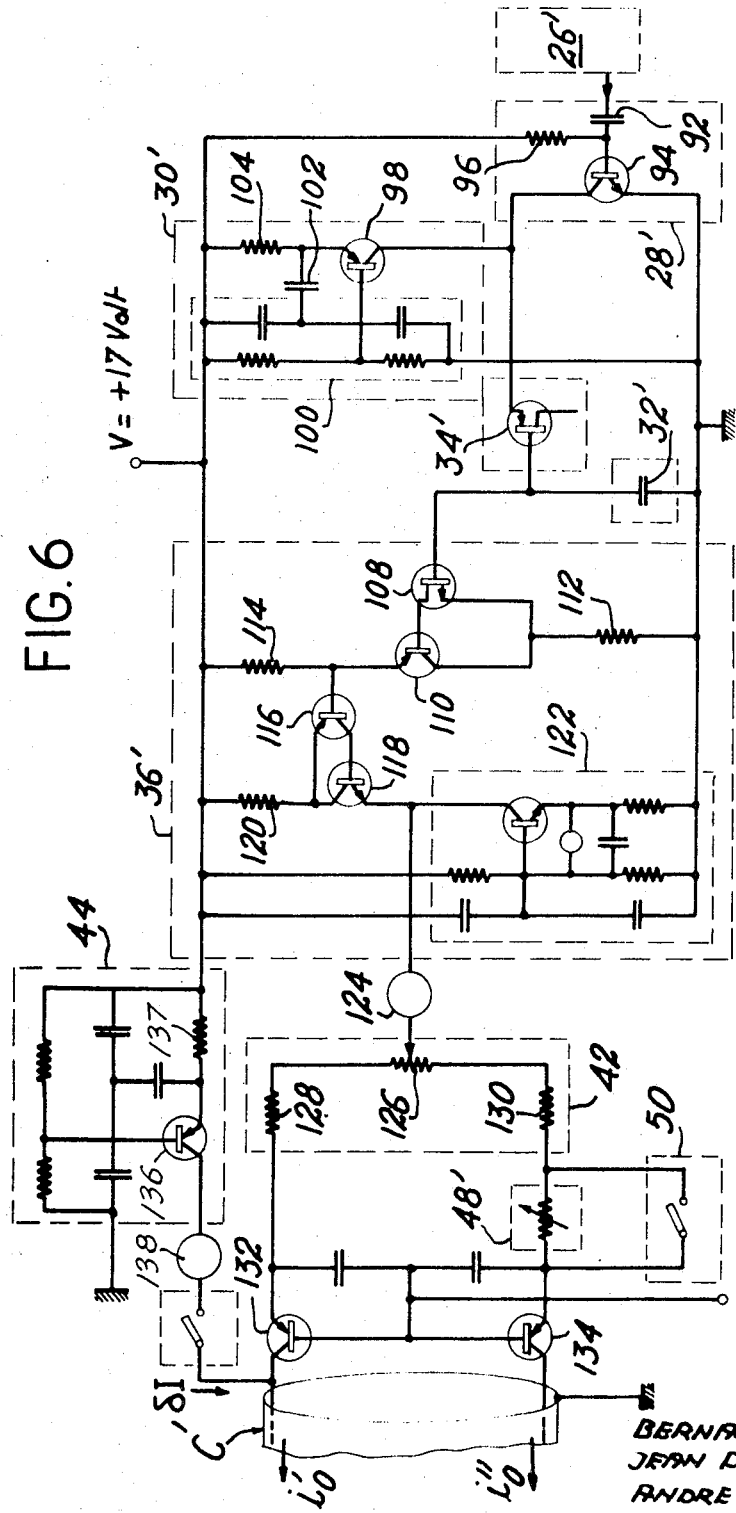

There will now be described by way of example a detection head (shown in FIG. 5) which is intended to be introduced in a probe unit for the purpose of lowering this latter down a borehole of substantial depth and the analytical equipment unit (shown in FIG. 6) which is associated with said detection head so as to constitute a single-channel selector, these two circuits being intended to provide high stability over a wide temperature range.

The pulse source 10' is constituted by a scintillator-photomultiplier assembly. The anode 52 of the photomultiplier drives a transistor 54 which is mounted as an amplifier and fitted with a bias resistor 56 having a value such that the transistor is slightly conductive when no signal is produced.

The effect of temperature on the base-emitter junction of the transistor 54 is counterbalanced by the base-emitter junction of a second transistor 58 of the same type as 54. The amplification gain can be adjusted by varying the ratio of output resistors 60 and 64 on the one hand and resistors 62 and 66 on the other hand.

The balancing circuit 38 comprises in addition to a potentiometer 68 the resistors 64 and 66 which have already been mentioned and which permit of finer adjustment of the balance. The transistors 70 and 72 serve as a separating stage and prevent the discrimination currents $i_o'$ and $i_o''$ from flowing back towards the source 10' when no pulses are produced.

The circuits having unilateral conductivity are constituted by diodes 14' and 14". The triggers 18' and 18" are similar: the trigger 18" which is the only one shown in the drawings comprises cascade-connected transistors 74 and 76 associated with resistors 78 and 80 which constitute their respective emitter loads. The resistor 82 is the collector load of the transistor 76.

The transistors 84 and 86 which are associated with the capacitors 88 and 90 serve as decoupling element. Thus, said transistors permit the flow of the currents $i_o'$ and $i_o''$ in the direction of the pulse source 10' while preventing the passage of pulses from the source towards the connecting cable C', the length of which can attain several hundreds of meters.

In FIG. 6, there is again shown the periodic pulse generator or clock 26'. Said clock can be constituted; for example, by a thyristor-type relaxation device which generates sawtooth signals, a differentiating circuit which supplies pulses of short time duration from the leading edges and a stage for shaping in time. This assembly has the advantage of supplying a frequency which has high stability as a function of temperature.

The clock 26' supplies an electronic switch 28' which comprises at the input a capacitor 92 which serves to transmit the clock pulses to the transistor 94 which is biased to saturation by a resistor 96. Thus, the transistor 94 is blocked throughout the duration of the negative pulses emitted by the clock at time intervals T.

The constant direct current generator 30' comprises a transistor 98 with a common base connection. The base of the transistor 98 is maintained at a constant voltage by a voltage divider 100 which is supplied with a stabilized voltage of +17V. A capacitor 102 removes the spurious signals which are liable to appear between base and emitter of the transistor 98. Since the base of transistor 98 is at a constant voltage, the voltage developed across the terminals of the fixed resistor 104 will be constant, the emitter current which flows through the resistor 104 will be constant and the collector current of the transistor 98 will also be constant. Said collector current flows to ground through the saturated transistor 94 outside the periods of reception of pulses from the clock 26' and through the grid junction of a field effect transistor 34' which operates as a diode during these periods.

A field effect transistor has been chosen by reason of its virtually zero reverse conductivity and its speed of transition. A capacitor 32' performs the function of memory. Since the current which flows through the transistor 34' is constant and the duration of each pulse is constant, the quantity of electricity which is transmitted at each pulse will be constant and the voltage steps at the terminals of the memory capacitor 32' will be equal to each other. Said steps will be added in the capacitor 32' providing that the input impedance of the circuit 36' which (as has been mentioned earlier) converts the voltage information into current is very high.

To this end, the circuit 36' comprises at its input a field effect transistor 108 which constitutes together with a complementary transistor 110 an arrangement which is referred to as a "common supercollector" circuit and has a practically infinite input impedance. The resistor 112 which serves as emitter load for the transistor equivalent to the common supercollector circuit applies an automatic bias to this circuit and the resistor 114 which is located within the emitter of the complementary transistor 110 serves as collector load. Thus, there is developed across the terminals of the resistor 114 an open circuit voltage which results from the automatic bias when the input voltage of the common supercollector circuit is zero, that is to say in respect of zero voltage across the terminals of the memory capacitor 32'. Subsequently, when the voltage increases at the terminals of the capacitor 32', the terminal voltage of the resistor 114 increases proportionally to that of the capacitor 32' starting from the open circuit level.

The terminal voltage of the resistor 114 is applied to a second "common supercollector" circuit comprising two transistors 116 and 118. A resistor 120 serves as emitter load for the transistor equivalent to the transistors 116 and 118. There appears across the terminals of said resistor 120 (subject to the difference of base-emitter potential of the transistor 116) a voltage equal in value to that which exists at the terminals of the resistor 114. There therefore flows through the collector circuit of the transistor equivalent to the circuit comprising the transistors 116 and 118, that is to say through the circuit of the emitter of transistor 118, a current practically equal in value to that which flows through the resistor 120 and therefore proportional to the terminal voltage of the resistor 114. The open circuit voltage which exists at the terminals of resistor 114 on no load causes the appearance of an open circuit current within the emitter of transistor 118. In order to counterbalance this current, provision is made for a constant-current outflow circuit 122 which is identical in principle with the circuit of the generator 36' which has the precise function of draining this open circuit current to ground. In this manner, no current is likely to flow through a checking milliammeter 124 on open circuit. On the other hand, as soon as the voltage accumulates in steps at the terminals of the memory capacitor 32', the current I which flows through the milliammeter 124, starting from zero, increases linearly as a function of time. Thus, the milliammeter 124 permits the indication of the position of the channel within the range of energy scanning. The circuit arrangement of FIG. 6 additionally comprises a potentiometric unit 42, the function of which is to divide the current I into two parts; this unit comprises a potentiometer 126 proper and two resistors 128 and 130 whose function is to increase the fineness of the adjustment. Transistors 132 and 134 having a common base connection and decoupled by capacitors serve as separating elements. The transistor 132 in particular prevents the auxiliary current δI derived from the circuit 44 from flowing back towards the potentiometric device 42. The transistor 134 ensures symmetry of the circuit.

The generator 44 which produces the constant current δI is similar in design to that of the generator 30' and will therefore not be described in detail; it comprises a transistor 136 which is mounted with a common base and associated with resistors and capacitors whose function is similar to that of the corresponding elements of the generator 30'. However, contrarily to the resistor 104, the resistor 137 is adjustable in order to permit regulation of δI which defines the channel width. A microammeter 138 serves to measure δI.

Provision is also made for an unbalance device consisting of the variable resistor 48 which is put into service by opening the switch 50. This resistor is graduated in percentage of energy and serves to make the channel width proportional to the energy.

The use of paired transistors for the assemblies 70–72, 84–86 (FIG. 5) and 132–134 (FIG. 6) coupled with the fact that use is made only of current intensity makes it possible to secure freedom from the harmful action of temperature. In a device which has actually been constructed, the drift was practically negligible within the temperature range of −40° to +70° C. The element which exhibited the lowest stability was the radiation detector.

What we claim is:

1. A method for analyzing the amplitude spectrum of electric pulses which spectrum is statistically invariable in time, comprising: generating a direct current of predetermined value; comparing the amplitude of each pulse with the value of said current; emitting a signal responsive to each pulse whose amplitude is greater than the amplitude value of the current; counting said signals; automatically varying said direct current value by predetermined steps at times forming separate intervals during which a plurality of pulses are compared with the corresponding direct current value; and separately counting said signals for each of said time intervals.

2. A method in accordance with claim 1, wherein a second direct current is generated having a second predetermined value, greater than the value of the first current, and wherein said signal is emitted when the amplitude of a pulse is greater than the value of the first current and less than the second predetermined value.

3. A method in accordance with claim 2, wherein the two values are caused to vary simultaneously in such a manner that their difference remains constant.

4. A method in accordance with claim 2, wherein the two currents are caused to vary simultaneously in such a manner that their difference is proportional to the average of the values of the two currents.

5. A device for analyzing the amplitude spectrum of electric pulses emitted by a source, comprising a generator for producing a direct current of predetermined and adjustable value, first means for modifying said value by steps at times forming separate intervals, second means for comparing the amplitude of a plurality of said electric pulses and the value of said direct current during each interval and for emitting a signal when the amplitude is greater than the said value, and counting means for counting the said signals separately during each of said intervals.

6. A device in accordance with claim 5, wherein said first means modifies the said current value at equal intervals of time.

7. A device in accordance with claim 5, wherein the generator supplies two different direct currents and the second means emits a signal only responsive to a pulse whose amplitude is comprised between the values of the two currents.

8. A device in accordance with claim 7, wherein said device consists of a first assembly comprising said source and said second means; a second assembly comprising said generator, said first means and said counting means; and a coaxial cable interconnecting said first and second assemblies.

9. A device in accordance with claim 8, wherein said source is a proportional radiation detector.

* * * * *